(12) United States Patent
Cude

(10) Patent No.: US 6,570,834 B1
(45) Date of Patent: May 27, 2003

(54) ELECTROMAGNETIC INDUCTIVE DRIVE AND METHOD OF MAKING THE SAME

(75) Inventor: Rodney P. Cude, Dothan, AL (US)

(73) Assignees: Sony Corporation (JP); Sony Electronics, Inc., Park Ridge, NJ (US)

( * ) Notice: Subject to any disclaimer, the term of this patent is extended or adjusted under 35 U.S.C. 154(b) by 75 days.

(21) Appl. No.: 09/702,864

(22) Filed: Nov. 1, 2000

(51) Int. Cl.$^7$ ............ G11B 23/00; G11B 33/14
(52) U.S. Cl. .................... 369/258; 360/97.02
(58) Field of Search .................. 369/258, 266; 360/97.02, 137

(56) References Cited

U.S. PATENT DOCUMENTS

| | | |
|---|---|---|
| 5,353,174 A | 10/1994 | Uno |
| 5,631,787 A | 5/1997 | Huang et al. |
| 6,049,520 A * | 4/2000 | Bassett ............... 369/266 |
| 6,069,766 A | 5/2000 | Battu et al. |
| 6,078,477 A | 6/2000 | Adams et al. |
| 6,084,744 A | 7/2000 | Genheimer et al. |
| 6,115,214 A | 9/2000 | Allsup et al. |
| 6,122,164 A | 9/2000 | Liao et al. |
| 6,124,709 A * | 9/2000 | Allwine ............ 324/207.2 |
| 6,239,943 B1 * | 5/2001 | Jennings et al. ...... 360/97.02 |
| 6,265,800 B1 * | 7/2001 | Kimura et al. ........... 360/137 |

* cited by examiner

*Primary Examiner*—Allen Cao
(74) *Attorney, Agent, or Firm*—Rader, Fishman & Grauer PLLC

(57) ABSTRACT

An improved disc drive. The disc drive having a generator assembly and method of making thereof includes at least one data storage medium; a rotor magnet attached to the edge of each data storage medium; and a stator magnet spaced apart from the rotor magnet. The disc drive data storage system further includes a pivot shaft; at least one actuator mounted to the pivot shaft; at least one read/write head mounted to the distal end of the actuator; a spindle motor; at least one spacer ring; and a spindle hub. The spindle hub retains the data storage medium and the spacer rings to the spindle motor in an assembled relationship; and a junction. Either the rotor magnet or the stator magnet, or both, may be a coil magnet. An electric current is produced within the windings of a coil magnet by electromagnetic induction. Current generated within the coil windings of the magnet is transferred through a junction to the battery. The data storage medium is one of a hard disc, a compact disc and an optical disc.

19 Claims, 3 Drawing Sheets

ELECTROMAGNETIC INDUCTIVE DRIVE AND METHOD OF MAKING THE SAME

BACKGROUND OF THE INVENTION

1. Field of the Invention

This invention relates generally to an apparatus and method for reducing the power consumption of a disc drive data storage system. More particularly, the present invention relates to a disc drive including one or more hard discs, each disc having a substantially circumferential magnetic member on its outer edge proximate a second magnetic member to reduce the total electrical power consumed by the disc drive data storage system.

2. Brief Description of the Prior Art

Disc drive data storage systems are typically used in devices such as mainframe computers, workstations, personal computers, and other types of devices where data storage is a basic requirement. Using these data storage systems, large amounts of data can be quickly stored and accessed.

Advances in electronics and semiconductor technologies have led to the creation of portable, battery-operated personal computers such as notebook or laptop computers. These devices combine the power of performing computer-related tasks with the convenience of portability. A typical battery-powered portable computer must efficiently and dependably function using a low voltage battery-operated power source. However, a constraint that has confronted the developer of such portable computers is the limited amount of power that is available from the power pack, usually a rechargeable battery.

Conventional disc drive data storage systems consume a large portion of the total available battery power, thus, substantially contributing to the total power used by a portable computer. For example, significant power is required to maintain disc rotation at a constant speed and to position the actuator assembly to selectively transport the read/write head over a target data track on the disc. Disc drives containing multiple discs, while storing a voluminous quantity of data, consume more power than disc drives containing a single disc.

Moreover, environmental concerns about energy conservation have made it desirable to reduce the power consumed by disc drives used in portable computers.

Consequently, there is a need for a reduction in disc drive power consumption to reduce the total power used by the portable computer.

BRIEF SUMMARY OF THE INVENTION

The general object of the present invention is to provide an improved disc drive data storage system having a reduced power consumption.

The primary object of the present invention is to lower the overall power consumption of the disc drive by recapturing a portion of the mechanical energy dissipated by the disc drive.

A further object of the present invention is to increase the battery life of a portable computer by reducing the battery drain.

Specifically, a disc drive having a generator assembly and method of making the same, in accordance with a preferred embodiment of the invention, includes at least one data storage medium; a rotor magnet attached to the edge of each data storage medium; and a stator magnet spaced apart from the rotor magnet. Depending upon the configuration of the disc drive assembly, either the rotor magnet or the stator magnet, or both, may be a coil magnet.

The rotor magnet and the stator magnet are positioned such that rotation of the rotor magnet induces current in the windings of the stator magnet. When the rotor magnet is rotated, the rotor magnet generates a magnetic field that interacts with the coil windings of the stator magnet. This rotation generates an electric current by electromagnetic induction. The induced current generated within the coil windings of the stator magnet is transferred to the junction, where it is rectified by junction before being transferred to the battery.

In accordance with a preferred embodiment of the invention, the disc drive data storage system further includes a pivot shaft; at least one actuator mounted to the pivot shaft; at least one read/write head mounted to the distal end of the actuator; a spindle motor; at least one spacer ring; a spindle hub; and a junction. The spindle hub retains the data storage medium and the spacer rings to the spindle motor in an assembled relationship. Current generated within the coil windings of the magnet is transferred through the junction to a battery. The data storage medium is one of a hard disc, a compact disc and an optical disc.

These and other objects, advantages, aspects and features of the present invention will be more fully understood and appreciated upon consideration of the following detailed description of a preferred embodiment, presented in conjunction with the accompanying drawings.

BRIEF DESCRIPTION OF THE DRAWINGS

Other objects and advantages of the invention will become apparent from a study of the specification and drawings in which.

Throughout the drawing figures, like reference numerals will be understood to refer to like parts and components.

DETAILED DESCRIPTION OF THE PREFERRED EMBODIMENTS

The following description is presented to enable any person skilled in the art to make and use the invention, and is provided in the context of a particular application and its requirements. Various modifications to the preferred embodiment will be readily apparent to those skilled in the art, and the generic principles defined herein may be applied to other embodiments and applications without departing from the spirit and scope of the invention. Thus, the present invention is not intended to be limited to the embodiment shown, but is to be accorded the widest scope consistent with the principles and features disclosed herein.

To provide a detailed discussion of a preferred embodiment of the present invention, reference is now made to the drawings. It will be understood that numerous details of construction of disc drive that are not included in the following description as such are well known to one skilled in the art and are unnecessary for the purpose of describing the present invention.

Figure 1:
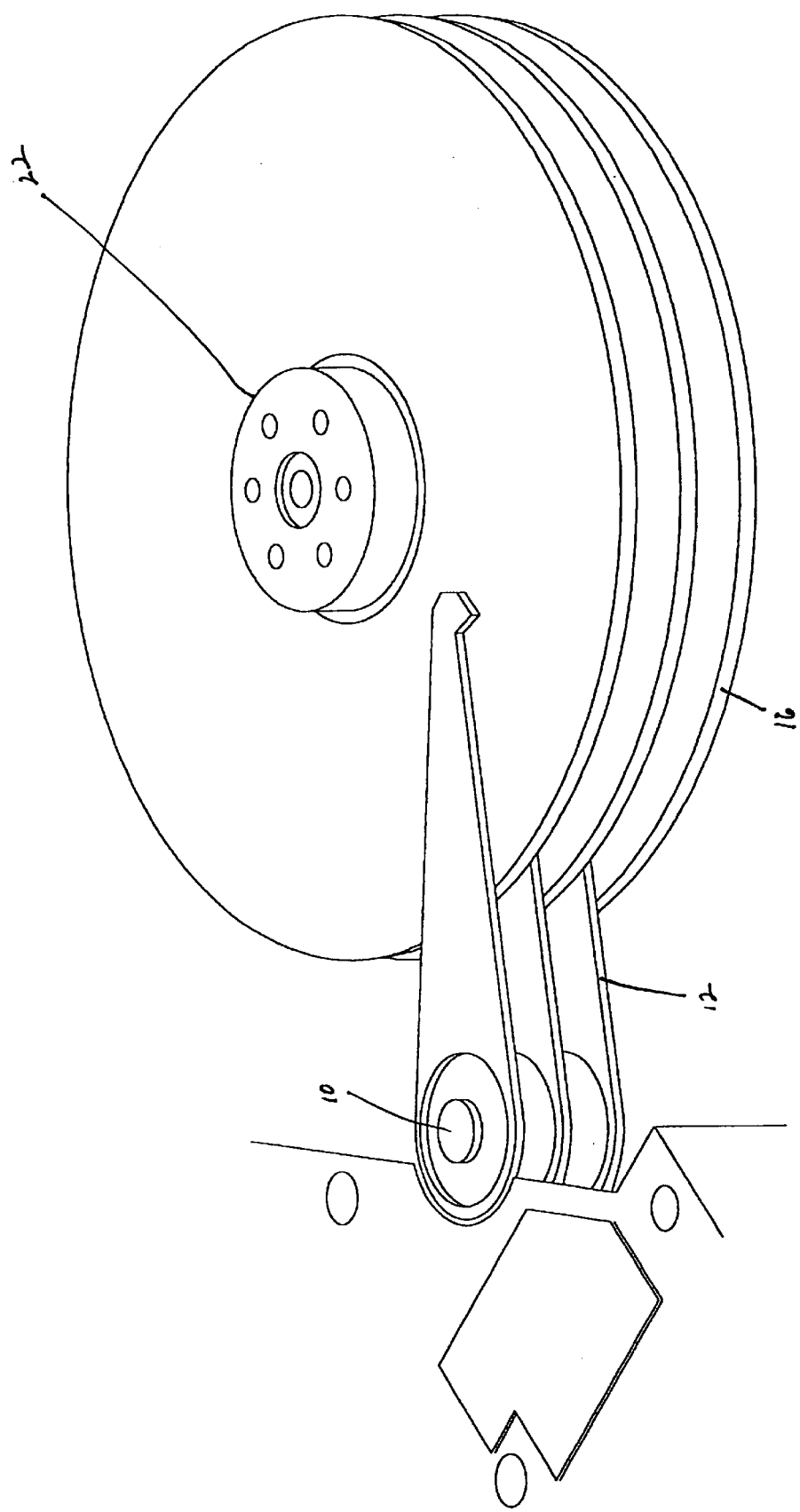
FIG. 1 shows major elements of the actuator assembly of the preferred embodiment.

Shown in FIG. 1 is the actuator assembly of the preferred embodiment. The actuator assembly, located adjacent a disc 16, includes a pivot shaft 10, an actuator arm 12 and the read/write heads 14 (not shown).

The actuator arm 12 is a beam that is rotationally suspended by the pivot shaft 10. This beam supports and positions the read/write heads 14 over the surface of the discs 16. Although a plurality of actuator arms 12 are shown in the figures, a single arm may be alternatively provided.

The read/write heads 14 are magnetic transducers that detect magnetic variations on a data track of the discs 16 to read the data stored on that track, and induce magnetic variations on the data track to write data to the track. The heads 14, being attached to the underside of the actuator arm 12 at the distal end of the beam, are supported over data tracks of the discs 16. Each of the read/write heads 14 is controllably stationed by the actuator arm 12 over a data track to either read data from or write data to the data track.

The disc assembly includes the discs 16, a spindle motor 18 (not shown), spacer rings 20 (not shown), and the spindle hub 22. The spindle motor 18, located below the stack of discs 16, rotates discs 16 at a constant rate of speed. The spacer rings 20 are positioned between the discs 16 to provide disc separation. The disc surfaces are axially separated to allow its read/write head 14 to fly over surface of each disc 16. The spindle hub 22 is an end cap to retain the disc stack and the spacer rings 20 to the spindle motor 18 in an assembled relationship.

Each disc 16 is constructed from glass, aluminum, or the like, and is coated with a magnetic storage material. Data, in the form of magnetic flux variations, are stored within the data tracks on the surface of discs 16. Each concentric data track is divided into a number of data sectors where data is stored in data blocks. The read/write heads 14 are positioned adjacent the data tracks to read data from or write data to the tracks.

Figure 2:
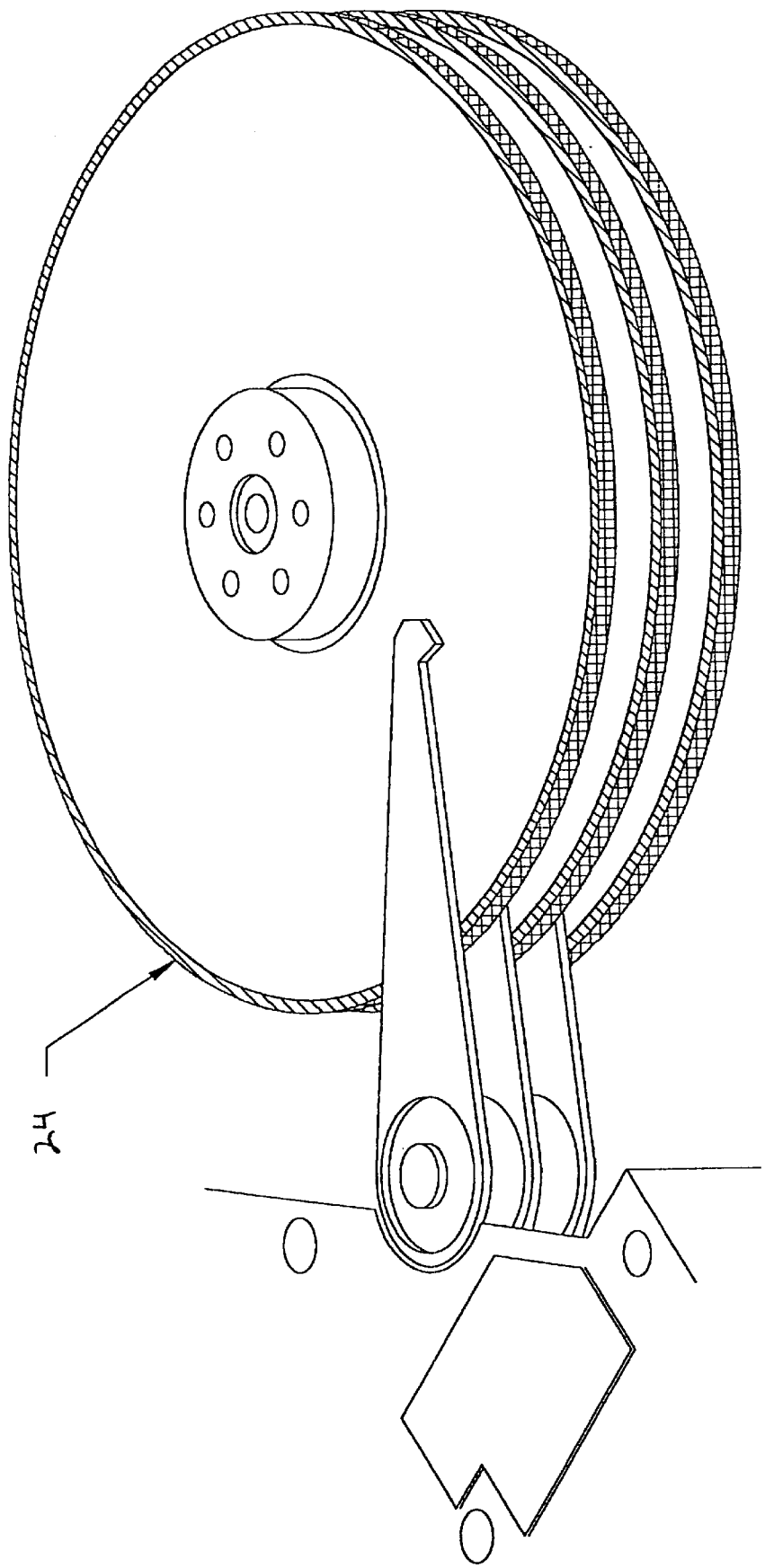
FIGS. 2 and 3 show the major elements of the generator assembly of the preferred embodiment.
Figure 3:
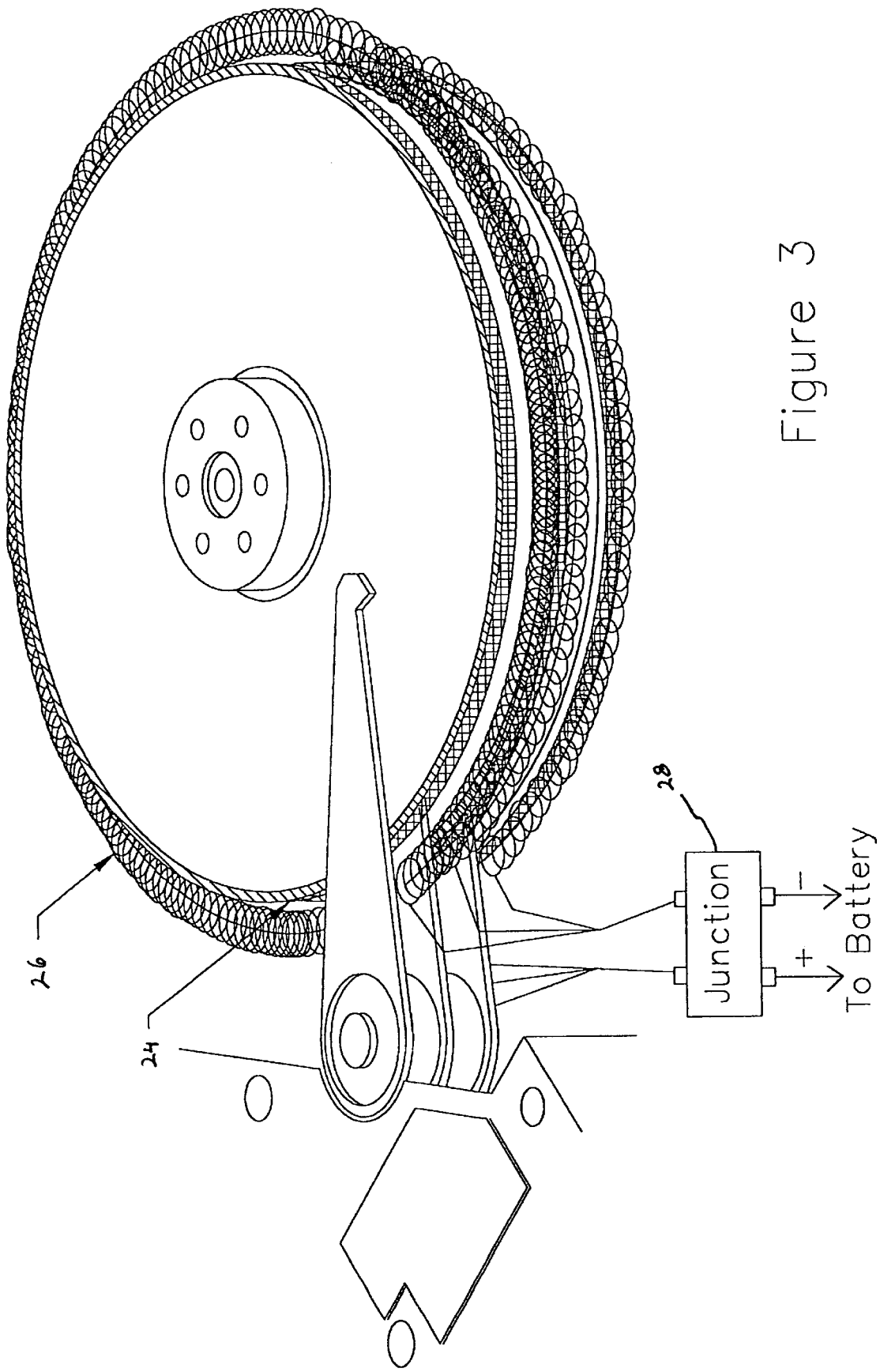

FIGS. 2 and 3 show the major elements of the generator assembly such as a rotor magnet 24, a stator magnet 26, and a junction 28. The generator assembly is power conversion system that transforms mechanical energy produced by the spinning of the drive assembly into electrical energy. In effect, some of the energy produced by the battery is recaptured and returned to the battery. This reclaimed energy increases the effective battery life.

In the preferred embodiment, the rotor magnet 24 of the preferred embodiment is a lightweight permanent magnet, while the stator magnet 26 is a coil magnet that is wrapped around a nonconductive core. This core supports the stator magnet 26 within the chassis of the disc drive data storage system to maintain a constant distance between the stator magnet 26 and the rotor magnet 24. As shown in FIG. 2, the rotor magnet 24 is mounted to the outer edge of disc 16. Referring to FIG. 3, the stator magnet 26 is circumferentially spaced from, but in close proximity with, the rotor magnet 24.

The rotor magnet 24 and the stator magnet 24 are positioned such that rotation of the rotor magnet 24 induces current in the windings of the stator magnet 26. Being radially aligned, the rotor magnet 24 is arranged for rotation relative to the stator magnet 26. The rotor magnet 24 generates a magnetic field that interacts with the coil windings of the stator magnet 26. Upon rotation of the rotor magnet 24, the magnetic field generated by the rotor magnet 24 intercepts the coil windings of the stator magnet 26. This rotation generates an electric current in the coil windings of the magnet 26 by electromagnetic induction. An increase in the rotational velocity of the rotor magnet 24 or an increase in the number of discs 16 will result in the increased production of electrical current. The induced current generated within the coil windings of the stator magnet 26 is transferred to the junction 28, where it is rectified by junction 28 before being transferred to the battery.

Although FIG. 3 depicts the rotor magnet 24 as a non-coil permanent magnet and the stator magnet 26 as a coil magnet, a first alternative embodiment of the preferred invention includes the rotor magnet 24a (not shown) as a coil magnet and the stator magnet 26a (not shown) as a non-coil permanent magnet.

As a second alternative.embodiment both the rotor magnet 24a and the stator magnet 26 are coil magnets.

In a third alternative embodiment, the coil rotor magnet 24a is applied to the edge of the discs 16. Current induced within the winding of coil rotor magnet 24a is then transferred to the junction 28. Each end of coil rotor magnet 24a is in contact with an electrical connector to provide an interface from the coil rotor magnet 24a to the junction 28. A guide (not shown) to permit the electrical connector to maintain contact with the coil rotor magnet 24a during normal disc drive operation is also included within the disc drive data storage system. In this alternative embodiment, wires leading to and from the electrical connector are routed under each disc 16 to avoid disturbing the read/write heads 14.

Although three discs 16 are shown in the figures, those skilled in the art will realize that the invention is useful in disc drives having any number of discs.

The invention disclosed herein is not limited to a hard disc drive as a data storage medium, but instead may be applied to other types of data storage media such as compact disc (CD), digital video discs (DVD), floppy discs, optical discs, laser discs, and the like.

The invention disclosed herein may be applied to other rotating objects within a computer.

What is claimed is:

1. A data storage apparatus having reduced power consumption comprising:

at least one data storage medium;

a rotor magnet attached to the edge of each of said at least one data storage medium; and a stator magnet spaced apart from said rotor magnet, wherein the combination of said stator magnet and said rotor magnet producing an electric current.

2. The data storage apparatus of claim 1, wherein:
said stator magnet is a coil magnet.

3. The data storage apparatus of claim 1, wherein:
said electric current is produced within said stator magnet by electromagnetic induction.

4. The data storage apparatus of claim 1, wherein:
said rotor magnet is a coil magnet.

5. The data storage apparatus of claim 1, wherein:
said electric current is produced within said rotor magnet by electromagnetic induction.

6. The data storage apparatus of claim 1, wherein:
said stator magnet is circumferentially spaced from said rotor magnet.

7. The data storage apparatus of claim 1, further comprising:
a junction to interface said stator magnet to a battery.

8. The data storage apparatus of claim 1, wherein:
said data storage medium is one of a hard disc a compact disc and an optical disc.

9. The data storage apparatus of claim 1, further comprising:
a pivot shaft;

at least one actuator mounted to said pivot shaft;

at least one read/write head mounted to the distal end of said actuator;

a spindle motor;

at least one spacer ring;

a spindle hub, said spindle hub retaining said at least one data storage medium to said spindle motor and said spacer rings in an assembled relationship; and a junction.

10. A method of reducing power consumption by data storage apparatus comprising the steps of:

providing at least one data storage medium;

forming a rotor magnet on the edge of each of said at least one data storage medium; and forming a stator magnet spaced apart from said rotor magnet, wherein the combination of said stator magnet and said rotor magnet producing an electric current.

11. The method of claim 10, wherein:

said stator magnet is a coil magnet.

12. The method of claim 10, wherein:

said electric current is produced within said stator magnet by electromagnetic induction.

13. The method of claim 10, wherein:

said rotor magnet is a coil magnet.

14. The method of claim 10, wherein:

said electric current is produced within said rotor magnet by electromagnetic induction.

15. The method of claim 10, wherein:

said stator magnet is circumferentially spaced from said rotor magnet.

16. The method of claim 10, further comprising:

a junction to interface said stator magnet to a battery.

17. The method of claim 10, wherein:

said data storage medium is one of a hard disc, a compact disc and an optical disc.

18. The method of claim 10, further comprising:

providing a pivot shaft;

providing at least one actuator mounted to said pivot shaft;

providing at least one read/write head mounted to the distal end of said actuator;

providing a spindle motor;

providing at least one spacer ring;

providing a spindle hub, said spindle hub retaining said at least one data storage medium to said spindle motor and said spacer rings in an assembled relationship; and a junction.

19. A data storage apparatus having reduced power consumption comprising:

at least one means for storing data;

a first means for generating a first magnetic field, said first means is attached to the edge of each of said at least one means for storing data; and a second means for generating a second magnetic field spaced apart from said first means, wherein the combination of said first means and said second means producing an electric current.

* * * * *